United States Patent
Booth, III et al.

(10) Patent No.: US 7,773,611 B2
(45) Date of Patent: Aug. 10, 2010

(54) METHOD AND APPARATUS FOR PACKET LOSS DETECTION

(75) Inventors: Earl Hardin Booth, III, Raleigh, NC (US); W. Mark Townsley, Nashville, TN (US); Thomas D. Nadeau, Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 1402 days.

(21) Appl. No.: 11/153,649

(22) Filed: Jun. 15, 2005

(65) Prior Publication Data
US 2006/0285500 A1    Dec. 21, 2006

(51) Int. Cl.
*H04L 12/28* (2006.01)
(52) U.S. Cl. .................. 370/401; 370/394; 370/392
(58) Field of Classification Search .................. None
See application file for complete search history.

(56) References Cited

U.S. PATENT DOCUMENTS

| 2003/0154259 A1* | 8/2003 | Lamberton et al. .......... 709/213 |
| 2005/0238049 A1* | 10/2005 | Delregno .................... 370/466 |
| 2006/0140188 A1* | 6/2006 | Shearer et al. .............. 370/394 |
| 2006/0262735 A1* | 11/2006 | Guichard et al. ............ 370/254 |

* cited by examiner

*Primary Examiner*—Duc C Ho
(74) *Attorney, Agent, or Firm*—Brinks Hofer Gilson & Lione

(57) ABSTRACT

Conventional network packet traffic loss/drop monitoring mechanisms, such as that employed for pseudowire, IP flow and tunnel traffic monitoring, do not process or diagnose the aggregate counts from both endpoints of a particular pseudowire. A packet loss and detection mechanism periodically exchanges traffic packet counts to maintain an accurate diagnosis of the pseudowire health from either endpoint. Further, the raw packet counts are analyzed to identify misrouted and lost packets, as both should be considered to assess network health and congestion. The pseudowire statistics are maintained for each pseudowire emanating from a particular edge router, providing a complete view of pseudowire traffic affecting a particular edge router. Such statistics are beneficial for problem detection, diagnosis, and for verification of throughput criteria such as those expressed in Quality of Service (QOS) terms and/or SLAs (service level agreements).

20 Claims, 6 Drawing Sheets

METHOD AND APPARATUS FOR PACKET LOSS DETECTION

BACKGROUND

In a conventional packet switched network such as a Multi-Protocol Label switching (MPLS) network or an IP (Internet Protocol) network, pseudowires (PWs) enable service providers to offer traditional layer-2 services such as Frame Relay, ATM, and Ethernet, among others, over a packet switched core. In doing so, such providers leverage a common MPLS or IP infrastructure for both their (Layer-2) L2 and (Layer-3) L3 services. While this provides both operating and capital expense savings for Service Providers (SPs), it also introduces new challenges in terms of operations and management (O&M/OAM/OA&M) of these new networks. One challenge that hasn't been completely addressed is the O&M toolset that a Service Provider can use to monitor and troubleshoot the pseudowires that carry the aforementioned services over their converged core. Specifically, it is important that a service provider be able to ensure that the Service Level Agreement (SLA) they have with the customer is being meet. Some technologies like Pseudowire Virtual Circuit Connectivity Verification (VCCV) and other MPLS OAM techniques, such as that disclosed in U.S. patent application Ser. No. 11/135,253 filed May 23, 2005, entitled, "SYSTEM AND METHODS FOR PROVIDING A NETWORK PATH VERIFICATION PROTOCOL" is being used to help monitor the health of the pseudowire, but these tools by themselves only provide a periodic analysis of the pseudowire in terms of reachability. Exemplary references of such usage include the following: U.S. patent application Ser. No. 11/001,149 filed Dec. 1, 2004, entitled, "SYSTEM AND METHODS FOR DETECTING NETWORK FAILURE", U.S. patent application Ser. No. 11/086,007 filed Mar. 22, 2005, entitled, "SYSTEM AND METHODS FOR IDENTIFYING NETWORK PATH PERFORMANCE", U.S. patent application Ser. No. 11/072,082 filed Mar. 4, 2005, entitled, "SYSTEM AND METHODS FOR NETWORK REACHABILITY DETECTION", and U.S. patent application Ser. No. 11/091,058 filed Mar. 28, 2005, entitled, "METHOD AND APPARATUS FOR THE CREATION AND MAINTENANCE OF A SELF-ADJUSTING REPOSITORY OF SERVICE LEVEL DIAGNOSTICS TEST POINTS FOR NETWORK BASED VPNS". However, these tools may not address the need service providers have to quantify the amount of packet loss for a given pseudowire. In addition to monitoring ongoing packet loss, a tool that could measure packet loss on a pseudowire over a fixed period of time on an ad hoc basis would allow a service provider to troubleshoot customer reported problems as they occur by isolating them to either the provider network or the customer network.

SUMMARY

In a conventional managed information environment, such as a service provider core network interconnecting local area networks (subnetworks) and corresponding end users, pseudowires provide a virtual connection between edge routers defining the edges of the core network. A plurality of pseudowires may be established between the edge routers, therefore providing an infrastructure for efficient traversal of the core network by user message traffic. The pseudowires enable a native service, such as ATM, Frame Relay, Ethernet and others for emulation over the core network operable with IP, MPLS, or L2TP3 (Layer 2 Tunneling protocol Version 3).

A typical pseudowire, therefore, defines two endpoints at the respective provider edge (PE) routers that the pseudowire interconnects. Conventional pseudowire connections, as with typical packet switched based connections, maintain counts of packets transmitted and received. However, conventional mechanisms maintain only counts at the particular endpoint. Further, no analysis or diagnosis of the packet counts is performed. Accordingly, configurations herein are based, in part, on the observation that conventional pseudowire traffic monitoring does not process or diagnose the aggregate counts from both endpoints of a particular pseudowire.

Unfortunately, therefore, conventional packet traffic monitoring mechanisms maintain only transmitted and received packet counts at the router defining a respective endpoint. No correlation of packets with the opposed endpoint is performed. Further, no analysis of packet counts, such as misordered packets as distinguished from lost packets, is performed. Therefore, an operator or user is unable to directly monitor packets lost or misordered over a particular connection. In a large core network, the number of pseudowires may be substantial; thereby presenting difficulties in identifying or isolating congestion that appears only as a slowdown at a particular edge router.

Configurations discussed herein substantially overcome the above shortcomings presented by conventional packet traffic monitoring by periodically exchanging traffic packet counts to maintain an accurate diagnosis of the pseudowire health from either endpoint. Further, the raw packet counts are analyzed to identify misrouted and lost packets, as both are considered to assess network health and congestion. The pseudowire statistics are maintained for each pseudowire emanating from a particular edge router, providing a complete view of pseudowire traffic affecting the edge router. Such statistics are beneficial for problem detection, diagnosis, and for verification of throughput criteria, such as those criteria expressed in Quality of Service (QOS) terms and/or SLAs (service level agreements).

In further detail, the method of tracking packet loss includes selectively identifying a router interconnection, such as a pseudowire, IP flow or tunnel, for packet anomaly detection, such as lost and misordered packets, and tracking the detected packet anomalies at both termination points of the router interconnection. The routers periodically exchange packet anomaly statistics to synchronize packet anomaly counts between the termination points of the router interconnection. The anomaly statistics correspond to the termination point and a particular opposed termination point. The counters, therefore, are particular PE routers having counters at pseudowire termination points, in which the pseudowire is defined by a set of labeled paths between provider edge routers and operable as a virtual circuit through the core network.

Tracking the packet anomalies includes maintaining a packet loss count and a count of misordered packets. The PE routers perform the tracking by writing a sequence number in a packet. The sequence number corresponds to a set of packets sent on a particular pseudowire (i.e. a larger message sent as a series of packets). The opposed router receives the sequence number in the packet at the termination end of the pseudowire, and compares the sequence numbers to previous sequence numbers to identify order and omission of packets. The receiving PE router, therefore, inspects each packet to determine if the packet is in order, preceding a previously receive packet, or advanced from a next expected packet. If the packet is advanced, the router computes the difference of the received and expected packet numbers, and increments the lost packets by the computed difference. If the packet is preceding (i.e. sequence number preceding one already received), the router increments the out of order packets.

The routers exchange packet anomaly statistics by posting (transmitting) statistics to the remote PE router by at least one of: a VCCV status, L2TP WAN error notification, Bi-Directional Forwarding Detection (BFD) keep alive, or a Label Distribution Protocol (LDP) status message. In the exemplary configuration, each pseudowire router maintains counts pertaining to both termination points, and exchanges VCCV messages between each of the termination points to propagate consistent counts of the lost packets and misordered packets. Tracking is selectively enabled for particular pseudowires by initiating counts at a termination point (PE router) of a pseudowire, and transmitting the counts in a control message to the opposed termination point of the pseudowire. The opposed (far end) PE router commences, responsive to the received control message, the counts at the opposed termination point.

In particular configurations, counts are maintained at a plurality of successive endpoints, in which the successive endpoints are operable for concatenation into a larger virtual circuit, each of the pairs of successive endpoints defining a particular provider subnetwork operable by a particular independent provider, such as in consecutive service provider networks. In particular implementations, particularly those having many PE routers, propagating consistent counts may further include aggregating the counts for each of the pseudowires. The routers denote packets indicative of count information via a control field operable to indicate control information. Such a control message may take the form of a distinguishing control word in the message, which may be scrutinized to initiate counts as described herein.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
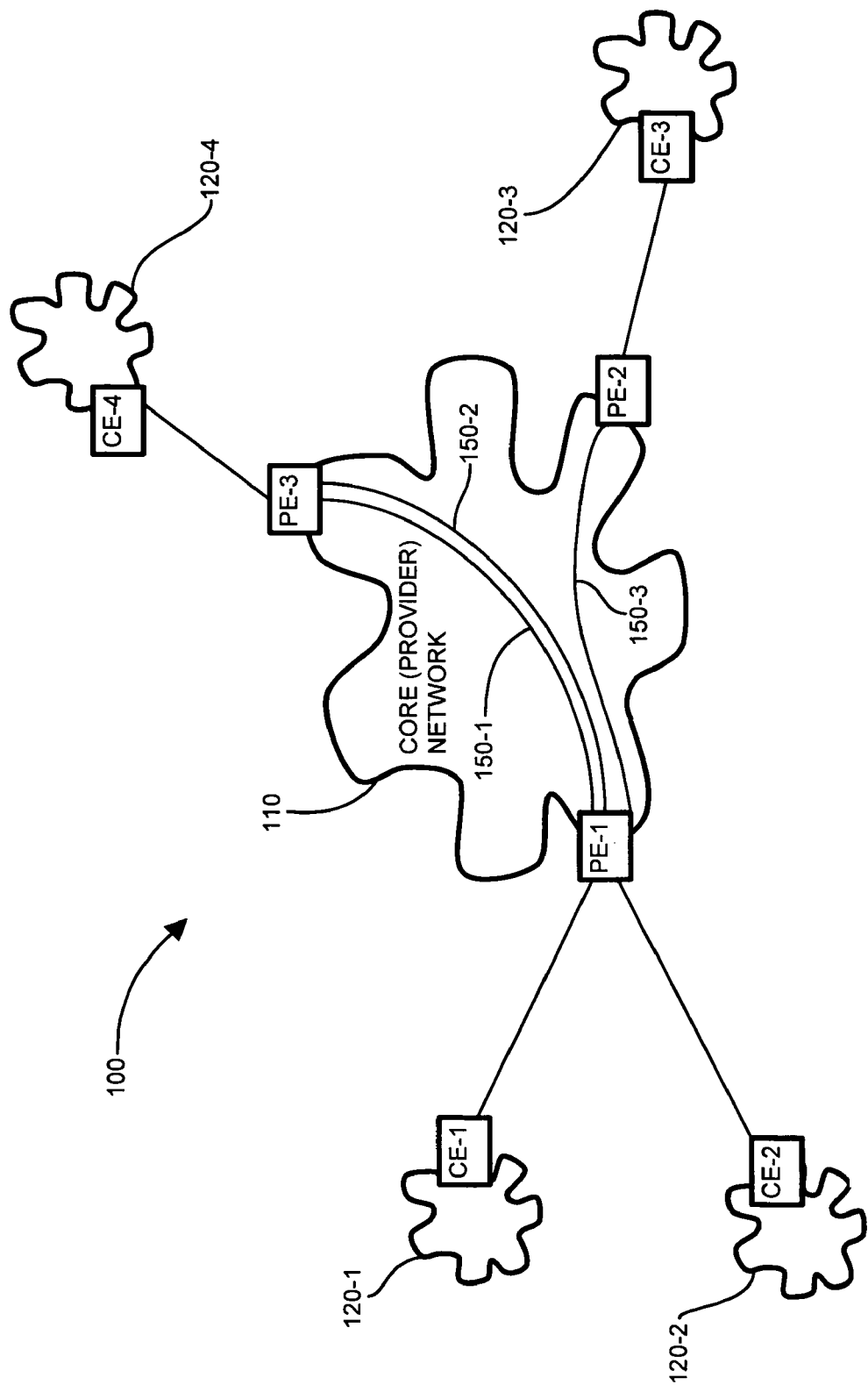
FIG. 1 is a context diagram of a network communications environment depicting pseudowires interconnecting PE routers across a core network.

Configurations herein are based, in part, on the observation that conventional pseudowire traffic monitoring does not process or diagnose the aggregate counts from both endpoints of a particular pseudowire. It would be beneficial for the PE routers to periodically post packet statistics to the far-end (opposed) PE router to enable queries based on the full packet drop/loss context of the pseudowire or other connection. Configurations discussed herein substantially overcome the above shortcomings of conventional packet traffic monitoring by periodically exchanging traffic packet counts to maintain an accurate diagnosis of the pseudowire health as observable from either endpoint. Further, the raw packet counts are analyzed to identify misrouted and lost packets, as both are considered to assess network health and congestion. The pseudowire statistics are maintained for each pseudowire emanating from a particular edge router, providing a complete view of pseudowire traffic affecting the edge router. Such statistics are beneficial for problem detection, diagnosis, and for verification of throughput criteria such as those expressed in Quality of Service (QOS) terms and/or SLAs.

Conventional packet counter mechanisms do not compute or detect the packet loss on a pseudo-wire directly and completely. While packets may be injected into a pseudowire and counted on the other side using a network analyzer, this approach is not typically desirable given the large number of pseudowires typically deployed between any two provider edge devices (PEs). Furthermore, such an approach does not typically take into account the injection and processing of control plane packets on these pseudowires.

Packet loss calculation may be achievable by employing native service OAM (Operations and Maintenance) techniques such as ATM (Asynchronous Transfer Mode). However, such solutions do not take into account all of the traffic traversing the pseudowire. They also run end-to-end (between clients of the access circuits attached to the PWs), which impedes detection of the packet loss on the actual pseudowire portion of the connection.

Conventional sequence numbers on pseudowire frames exist in both MPLS-based and L2TPv3 pseudowire tunneling technologies. The most commonly referenced use for pseudowire sequencing, however, is to ensure in-order delivery of packets across a pseudowire. Configurations herein also employ the sequence numbers, but for OAM rather than an as an aide to the pseudowire emulation.

Conventional mechanisms, therefore, employ sequence numbers typically for detecting congestion within a network. The method proposed herein, in contrast, further addresses troubleshooting and OAM, as well as network congestion. Further, the method presented herein provides specific user query ability, in addition to an active congestion control mechanism using sequence numbers. Conventional counters maintain only transmit and receive counters, and do not propagate the counts to the opposed endpoint for identifying lost packets. Accordingly, configurations herein perform a count of packets that were never received through a message count synchronization message, which posts (exchanges) message tracking statistics across both opposed ends (termination points) of a pseudowire or other suitable connection.

FIG. 1 is a context diagram of a network communications environment depicting pseudowires interconnecting PE routers across a core network. Referring to FIG. 1, a network communications environment 100 includes a service provider core network 110, such as a packet switched network operable for message traffic transport using MPLS, IP, or L2TPV3. The core 110 includes a plurality of provider edge nodes PE-1 . . . PE-3 (PE, generally), each interconnecting with one or more customer edge (CE) routers CE-1 . . . CE-4 (CE generally). The customer edge routers CE connect to a local subnet 120-1 . . . 120-4 (120 generally) such as a LAN, VPN, or other user interconnection. Pseudowires 150-1-150-3 (150, generally) connect a pair of provider edge PE routers for enabling transport across the core network 110. Generally, the pseudowires 150 each interconnect a pair of PE routers, and may include multiple pseudowires 150 between the same PEs 150-1 . . . 150-2. Accordingly, the pseudowires 150 collectively form an interconnection matrix through the core 110. As indicated above, each of the pseudowires 150 emulates a particular transport service, or mechanism, such as an LSP (Labeled Switch Path) in an MPLS environment, for example.

Figure 2:
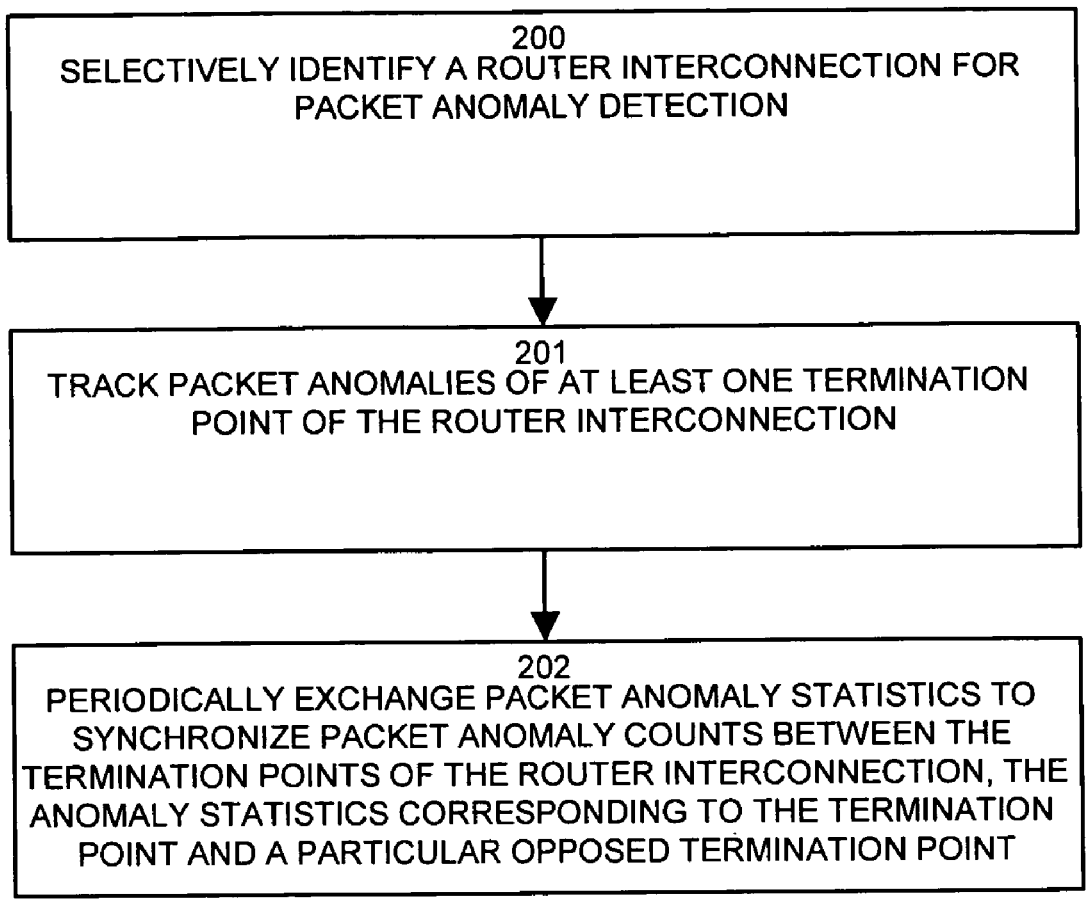
FIG. 2 is a flowchart of packet loss detection in the network of FIG. 1.

FIG. 2 is a flowchart of packet loss detection in the network of FIG. 1. Referring to FIGS. 1 and 2, the method of tracking packet loss as disclosed herein includes selectively identifying a router interconnection for packet anomaly (i.e. lost and misrouted) detection, as depicted at step 200. In the exemplary configuration, pseudowires between PE routers are scrutinized, however alternate configurations may examine other interconnection mechanisms, as discussed further below. The mechanism, upon invocation, begins tracking packet anomalies of at least one termination point of the router interconnection (i.e. pseudowire 150), as shown at step 201. Typically, both termination points initiate tracking, or counting, of the packet sequence numbers received, thus enabling packet loss querying from either endpoint. Each of the routers periodically exchanges packet anomaly statistics to synchronize packet anomaly counts between the termination points of the router interconnection, in which the anomaly statistics correspond to the termination point and a particular opposed termination point, as shown at step 202. As each router maintains the raw counts of loss and misroutes locally, a periodic exchange by each endpoint of the pseudowire enables a full pseudowire status from a query at either endpoint.

In a simplified service provider network scenario, a pseudowire might be characterized as follows:

CE1-PE1<-pseudowire->PE2-CE2

PE1 and PE2 represent the provider equipment, and the pseudowire emulates (i.e.: carries) the service's traffic transparently between PE1 and PE2 over a Packet Switched Network (PSN) core such as an MPLS or IP (L2TPv3) network 110. In order to overcome the above-described shortcomings, configurations herein provide a mechanism that allows an end-to-end pseudowire 150 packet loss detection mechanism for all traffic (data and control plane) that traverses the pseudowire. Note that in the exemplary MPLS network shown, the pseudowire connects the PE nodes (routers) across the core, and does not extend to the customer edge routers, which are typically coupled by another routing mechanism such as IP, LSP or other suitable link. Alternatively, In a Virtual Private Wire Service (VPWS), the pseudowire effectively extends the wire connection from the CE to the PE. In a Virtual Private LAN Service (VPLS), the pseudowires themselves are literally their own unique wires and may not have a one-to-one correlation to the CE wires.

The specific techniques being proposed below employ the packet sequencing mechanisms described in L2TPv3 and MPLS pseudowires 150. To understand this solution we first provide a bit of history on pseudowire sequencing. L2TPv3 provides a 24 bit sequence number and MPLS pseudowires provide a 16 bit sequence number. The typical behavior for sequencing is to ensure in-order delivery of packets received at PE1 and transmitted across the PSN to PE2 and vice-versa. When an out-of-order packet is received at either PE1 or PE2 from the pseudowire, the typical behavior is to either drop the packet or to buffer the packet in an attempt to reorder it. Particular L2VPN implementations may provide out-of-order drop behavior; however do not attempt to reorder packets. As packets are dropped due to ordering problems, a counter is incremented. Most service providers do not enable sequencing today as packet ordering issues typically do not cause problems in the protocols in use today. Many IP applications are not sensitive to packet ordering issues. In addition, due to the way service providers engineer the PSN networks for providing L2 services, packet-ordering issues are usually not encountered. In any case, sequencing is infrequently desired or employed in typical L2VPN/VPWS configurations.

In the configurations described herein, rather then employ sequencing in an attempt to ensure packet ordering, these configurations employ sequencing to count packets which were never received. The pseudowire termination points (e.g. PE routers) maintain two counters for each pseudowire 150 in order to provide the statistics to infer this information. The counters are:

1) Packets lost (134-3, below): Upon receiving a packet from the pseudowire, inspect the sequence number to determine whether the packet is in order, out-of-order (old), or in the future. If the packet is in the future, then subtract the number of packets between the received sequence number and the expected sequence number and add this to a running counter of packets lost, i.e.:

Expected sequence #: 5
Received sequence #: 10
Packets lost#: 5

2) Packets received out-of-order (134-4, below): This counter provides a method to determine whether the packets missed counter is a result of packets which were dropped in the provider network or just reordered. This computation is modeled as followed:

Expected sequence # 11
Received sequence #: 7
Packets out-of-order++

In the examples above, we would have counted 5 packets lost and one packet received out-of-order. From these 2 counters, we could infer that we lost a total of 4 packets.

By maintaining these two statistics and periodically extracting these counters from the data-plane into the control plane, the service provider can gage the overall "health" of their pseudowires 150 in terms of packet loss. Any particular PE only knows half of the end-to-end health of the pseudowire 150. All that can be monitored directly on any given PE is the number of packets not received from the far end PE. Conventional mechanisms are unable to directly know whether the packets a given PE is sending to a peer are actually making it there. Only the far-end PE knows this information. Alternatively, configurations herein propose a mechanism where the PEs periodically post their statistics to the far-end PE using an control channel message. This control channel message could take on a number of forms, i.e. the L2TPv3 Wan Error Notification message, a BFD keep-alive response packet transported inside of the VCCV control channel, or a LSP status message. By providing each PE a periodic snapshot of their "packets lost" counters, both PEs have an overall idea of the health of the pseudowire 150 and can report it as such to the operator. This is particularly important in the case where both ends of the pseudowire reside within different provider networks (i.e.: inter-provider or intra-provider networks).

The service provider may set thresholds based on these packet diagnostics such that when a certain packet loss threshold is reached, an alarm is generated and/or additional more detailed pseudowire analysis is triggered. The interval at which this invention runs is configurable by the operator, and is configurable on both ends of the pseudo-wire.

Since inclusion of sequence numbers may be expensive in terms of packet processing, the service provider may not want sequencing to be enabled all the time. Thus in some situations, it may be desirable to enable this packet diagnostic service dynamically, (i.e. based on customer feedback about problems in the service.) In order to enable this dynamic behavior, particular configurations selectively negotiate sequencing during pseudowire session establishment, and ensure that presence of the control word (which contains the sequence number) in either L2TPv3 or MPLS PWs is negotiated up front. The control word, as described above, initiates the counts at the opposed end of the pseudowire, and also distinguishes control traffic from data payload traffic. By ensuring that the control word is present, configurations may dynamically enable sequencing without having to re-establish the signaling and data-plane associated with the pseudowire. The provider would just need to indicate that "packet-loss detection" should be enabled on an up-and-running pseudowire that would then trigger an out-of-band message, or in-band message running on top of VCCV, to request that "packet-loss detection be enabled". Based on this event, the behavior described above would by dynamically enabled. The same type of exchange would be used to disable the packet loss algorithm. Furthermore, the configuration of a packet loss threshold can be used to trigger a back-up pseudowire (presumably over a different network path or to different equipment) or other type of connection to be utilized instead of the primary one. This threshold can be used in collaboration with a timer that can be used to measure a specific packet loss over a certain period of time, or even an average packet loss over a period of time.

Figure 3:
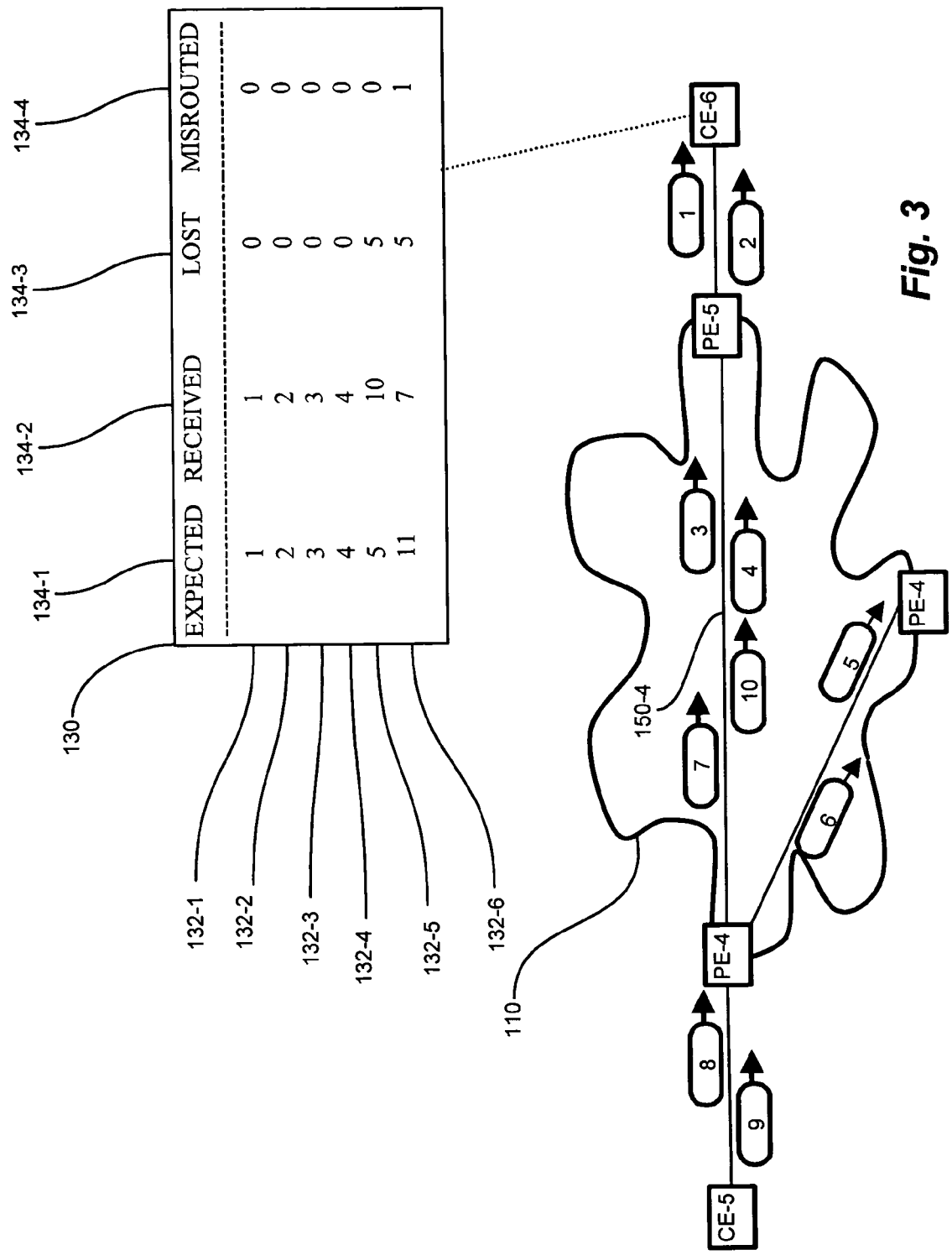
FIG. 3 is an example of applying packet loss detection to a sequence of packets in the network in FIG. 1.

FIG. 3 is an example of applying the packet loss detection scenario described above to a sequence of packets in the network in FIG. 1. Referring to FIG. 3, a router such as CE-6, operable according to techniques disclosed herein, employs a count repository 130, such as the exemplary packet history table, for maintaining the counts. Note that the repository 130 need not retain the entire packet history, as shown here for exemplary purposes. The exemplary repository 130 includes entries 132-1 . . . 132-6 (132, generally) for each packet, and contains fields for packets expected 134-1, packets actually received 134-2, a cumulative count of packets lost 134-3, and a cumulative count of packets misrouted 134-4. Particular configurations may maintain a running count of the lost 134-3 and misrouted 134-4 packets, rather than the entire table shown. A router CE-5 sends a plurality of messages 1 . . . 10 to router CE-6, over the path including the pseudowire 150-4 between PE-4 and PE-5.

As indicated by the repository 130 table, entries 132-1 . . . 132-4 indicate that packets 1-4 were received in order, resulting in zero counts for lost 134-3 and misrouted 134-4 packets. After receiving packet 4, packet 5 is expected, however packet 10 arrives, as shown by entry 132-5. Accordingly, the lost 134-3 count is computed: 10-5=5 packets lost. Packet 11 is now expected, as shown by entry 132-6, however packet 7 arrives. Since packet 7 precedes the expected packet 11, the misrouted count is incremented. Therefore, the misrouted packet count 134-3 mitigates the lost count 134-4 by accounting for packets deemed lost but later arriving. Further, packets 8 and 9 will contribute to the misrouted count 134-4, as will packets 5 and 6 if ultimately rerouted from PE-4. Therefore, analysis of the counts includes examining both counts, as packets deemed lost due to a misordering may ultimately arrive, resulting in a smaller difference between the lost 134-3 and misrouted 134-4 counts.

Figure 4:
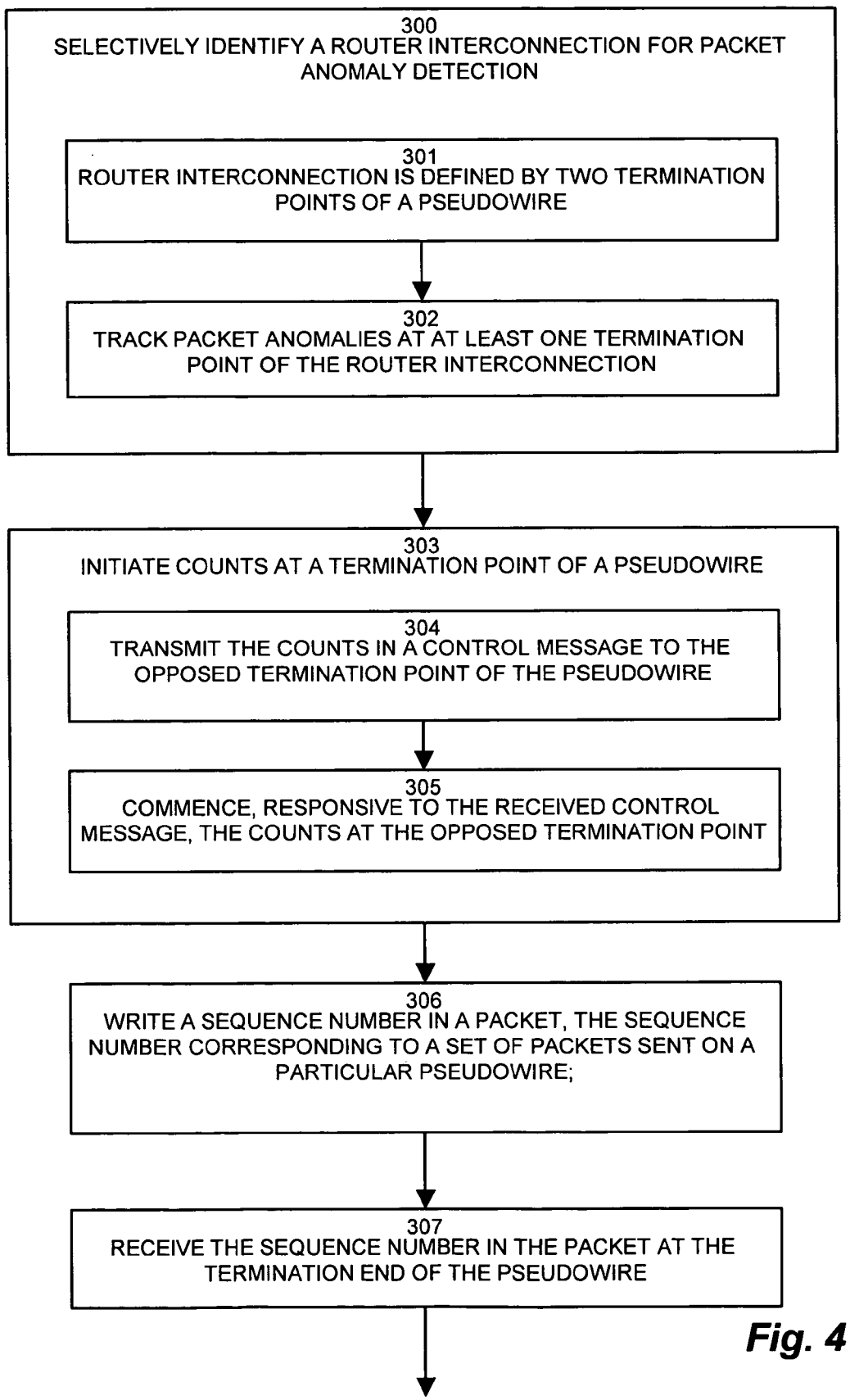
FIGS. 4-6 are a flowchart in further detail of packet loss tracking of a sequence of messages packets.
Figure 5:
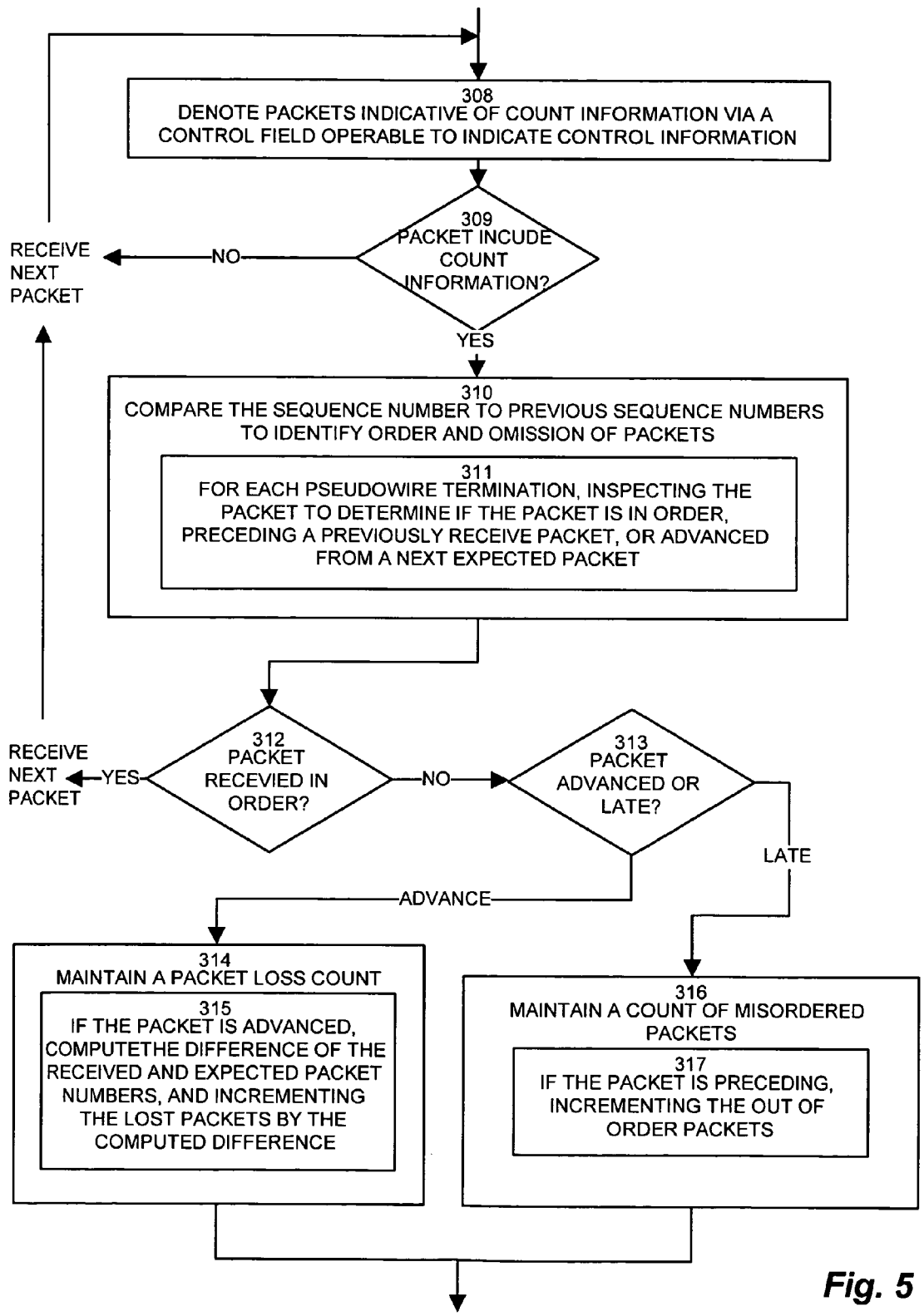
Figure 6:
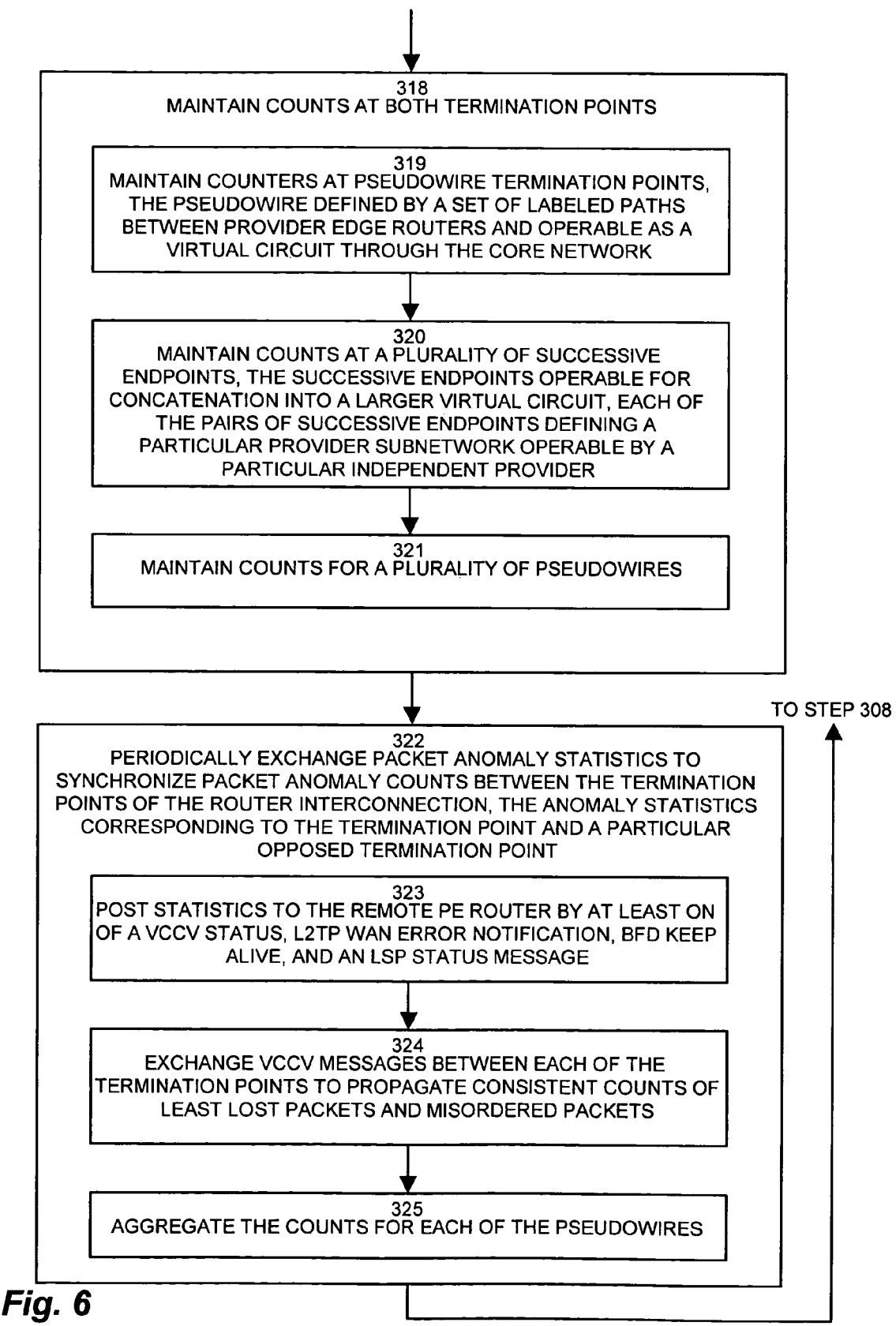

FIGS. 4-6 are a flowchart in further detail of packet loss tracking of a sequence of messages packets. In an environment such as that in FIGS. 1 and 3, an exemplary configuration operates as follows. Packet loss tracking and analysis includes selectively identifying a router interconnection for packet anomaly detection, as depicted at step 300. An operator or system administrator may enable and disable the tracking mechanism as desired. Such a router interconnection is defined by two termination points of a pseudowire 150, as shown at step 301. The operation of tracking packet anomalies is initiated for at least one termination point of the router interconnection, as disclosed at step 302, however typically is enabled at both ends.

The tracking initiates counts at a termination point (PE router) of a pseudowire 150, as shown at step 303. One of the PE routers begins transmitting the counts in a control message to the opposed termination point of the pseudowire, as depicted at step 304. The receiving router recognizes the control message as an indication to begin tracking, and commences, responsive to the received control message, the counts at the opposed termination point, as shown at step 305. In the exemplary configuration herein, the control messages are Virtual Circuit Connectivity Verification (VCCV) messages, distinguished by a control bit, however any suitable messaging mechanism may be employed. Upon initiation, each of the endpoint PE routers counts the received packets, typically by observing the sequence number. Accordingly, maintaining the counts further includes writing a sequence number in each packet, in which the sequence number corresponds to a set of packets sent on a particular pseudowire, as shown at step 306. The receiving router at the opposed termination point receives the sequence number in the packet at the termination end of the pseudowire, as depicted at step 307.

The receiving PE denotes packets indicative of count information via the control field discussed above operable to indicate control information as depicted at step 308. A check is performed, at step 309, to determine if a particular received packet includes count information. If not, control reverts to step 308 for receipt of the next packet. Note that in typical messaging environment sequence numbers may be a typical field of a packet. However, the control messages, such as the VCCV messages for initiating and posting (exchanging) statistics to peer PE routers are additional messages beyond the payload bearing traffic.

Upon receipt, the receiving PE router compares the sequence number to previous sequence numbers to identify order and omission of packets, as shown at step 310. As shown in the discussion of FIG. 3 above, at a particular termination point of a pseudowire 150, for each pseudowire termination, the router inspects the packet to determine if the packet is in order, preceding a previously receive packet, or advanced from a next expected packet, as depicted at step 311. A check is performed, at step 312, to determine if the sequence number is indicative of an out-of-order packet. If not, control reverts to step 308 for receipt of the next packet. Otherwise, a further check is performed, at step 313, to determine if the packet is advance, indicating possible loss of intervening packets, or misordered, indicating a later sequence number was previously received. Mathematically, this amounts to determining of the received sequence number is greater or less than the expected sequence number, as outlined above.

If the received sequence number is greater than the expected sequence number, then the intervening packets are presumed lost and the receiving router PE maintains the packet loss count accordingly, as shown at step 314. Since the received packet is advanced, the router PE-2 computes the difference of the received and expected packet numbers, and increments the lost packets by the computed difference, as depicted at step 315.

If the received sequence number is less than the expected sequence number, than the receiving router maintains a count of misordered packets, as shown at step 316. Since the received packet sequence No. precedes the expected packet, the router PE-2 increments the out of order packets, as shown at step 317. Note that purported lost packets, as accounted for by the advanced packets received, are mitigated by the misordered count when the "skipped:" packets are ultimately received as a lesser sequence number than the expected packets. One aspect to the distinction of misordered vs. lost packets is that some applications maybe restricted to receiving packets in the proper order and may therefore need to reorder misordered packets accordingly.

For each particular pseudowire for which the counts are enabled, the pertinent routers (PE-5,PE-6) maintain counts at both termination points, as depicted at step 318. In other words, the mechanism maintains counters at pseudowire termination points, in which the pseudowire is defined by a set of labeled paths between provider edge routers and operable as a virtual circuit through the core network, as depicted at step 319. In particular configurations, the pseudowires may be aggregated or concatenated, such as across multiple service provider networks. Accordingly, intervening routers maintain counts at a plurality of successive endpoints, in which the successive endpoints are operable for concatenation into a larger virtual circuit, such that each of the pairs of successive endpoints defining a particular provider subnetwork operable by a particular independent provider, as disclosed at step 320. Therefore, in a large core network, tracking the counts involves maintaining the counts for a plurality of pseudowires, as depicted at step 321. Depending on the configuration, a number of pseudowires may terminate in a particular PE router, interconnected with other PE routers and/or aggregated with pseudowires in the networks of adjacent service providers.

At each pseudowire, in order to provide the peer to peer posting of statistics that enables querying from either endpoint, maintaining the counts further includes periodically exchanging packet anomaly statistics to synchronize packet anomaly counts between the termination points of the router interconnection, in which the anomaly statistics corresponding to the termination point and a particular opposed termination point, as depicted at step 322. Therefore, exchanging packet anomaly statistics between PE endpoints of a particular pseudowire 150 includes posting statistics to the remote PE router by at least on of a VCCV status, L2TP WAN error notification, BFD keep alive, and an LSP status message, as shown at step 323. Further, the exemplary pseudowire connection may be an alternate connection, such as an IP flow, tunnel, or other virtual or physical arrangement characterized by endpoints and sequential packets.

Statistics are exchanged, or posted, to opposed PE routers by exchanging VCCV messages between each of the termination points (e.g. PE routers) to propagate consistent counts of at least lost packets and misordered packets, as depicted at step 324. Additional counts may be included in alternate configurations. Such reporting may further include aggregating the counts for each of the pseudowires 150, as shown at step 325, such as in the case of a large number of pseudowires from which to query. Control then reverts to step 308 for additional message traffic packets and further processing as discussed above.

Note that the methods disclosed herein are described with specific reference to a pseudowire implementation and the L2TPv3 and MPLS/PWE3 protocols. However, the use of sequence numbers to determine packet loss for OAM is applicable to a variety of situations. For example, IPsec, GRE and L2TPv2 (RFC2661) typically employ a sequence number operable in a similar manner (though GRE lacks a standard control channel feedback mechanism). IPsec is particularly interesting given its ability to negotiate specific IP filters to apply traffic to. The negotiated filters in IPsec are operable to apply to specific IP flows that one wished to analyze actual traffic loss on among points in a network.

Those skilled in the art should readily appreciate that the programs and methods for tracking packet loss as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for tracking packet loss has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of tracking packet loss comprising:
selectively identifying a router interconnection from a plurality of router interconnections for packet anomaly count detection;
tracking packet anomalies at a termination point of the router interconnection; and
periodically exchanging statistics of packet anomaly count detection to synchronize packet anomaly counts between the termination point of the router interconnection and a particular opposed termination point of the router interconnection, the anomaly statistics corresponding to the termination point and a particular opposed termination point,
wherein the router interconnection is defined by two termination points of the pseudowire includes a pseudowire.

2. The method of claim 1 wherein tracking packet anomalies further comprises:
maintaining a packet loss count; and
maintaining a count of misordered packets.

3. The method of claim 2 wherein maintaining the counts further comprises:
writing a sequence number in a packet, the sequence number corresponding to a set of packets sent on a particular pseudowire;
receiving the sequence number in the packet at the termination point of the pseudowire; and
comparing the sequence number to previous sequence numbers to identify order and omission of packets.

4. The method of claim 3 wherein exchanging statistics of packet anomaly count detection further comprises posting statistics to a remote PE router that is a termination point by at least one of a VCCV status, L2TP WAN error notification, BFD keep alive, and an LSP status message.

5. The method of claim 1 further comprising:
maintaining at least one count indicative of the packet anomalies at both termination points; and
exchanging connectivity status messages between each of the termination points to propagate consistent counts of lost or misordered packets.

6. The method of claim 5 further comprising maintaining the counts at a plurality of successive endpoints, the successive endpoints operable for concatenation into a larger virtual circuit, each of the pairs of successive endpoints defining a particular provider subnetwork operable by a particular independent provider.

7. The method of claim 6 wherein propagating consistent counts further comprises:
aggregating the counts for each of the pseudowires; and
denoting packets indicative of count information via a control field operable to indicate control information.

8. The method of claim 7 wherein maintaining the counts comprises maintaining counters at pseudowire termination points, the pseudowire defined by a set of labeled paths between provider edge routers and operable as a virtual circuit through the core network.

9. The method of claim 8 further comprising:
initiating counts at a termination point of the pseudowire;
transmitting the counts in a control message to the opposed termination point of the pseudowire; and
commencing, responsive to the received control message, the counts at the opposed termination point.

10. The method of claim 9 further comprising maintaining counts for a plurality of pseudowires, maintaining further comprising:
at the termination point of the pseudowire, for each pseudowire termination, inspecting the packet to determine if the packet is in order, preceding a previously receive packet, or advanced from a next expected packet;
if the packet is advanced, computing the difference of the received and expected packet numbers, and incrementing the lost packets by the computed difference; and
if the packet is preceding, incrementing the out of order packets.

11. A data communications device for tracking packet loss comprising:
a processor;
a memory responsive to the processor and operable for storing and retrieving instructions for tracking packet loss;
an interface coupled to a network for providing at least one router interconnection from a plurality of router interconnections to another data communications device, the interface responsive to the processor for selectively identifying a router interconnection for packet anomaly count detection; and
at least one counter operable to track packet anomalies at a termination point of the router interconnection, the instructions further operable to periodically exchange statistics of packet anomaly count detection to synchronize packet anomaly counts between the termination points of the router interconnection, the statistics of packet anomaly count detection corresponding to the termination point and a particular opposed termination point,
wherein the router interconnection is defined by two termination points of the pseudowire includes a pseudowire.

12. The data communications device of claim 11 wherein the at least one counter is further operable to tracking packet anomalies by:
maintaining a packet loss count; and
maintaining a count of misordered packets.

13. The data communications device of claim 12 wherein the data communications device is further operable to:
write a sequence number in a packet, the sequence number corresponding to a set of packets sent on a particular pseudowire;
receive the sequence number in the packet at the termination end of the pseudowire; and
compare the sequence number to previous sequence numbers to identify order and omission of packets.

14. The data communications device of claim 13 wherein the data communication device is further operable to post statistics to a remote PE router by at least one of a VCCV status, L2TP WAN error notification, BFD keep alive, and an LSP status message.

15. The data communications device of claim 14 wherein the instructions further operable to maintain counts at a plurality of successive endpoints, the successive endpoints operable for concatenation into a larger virtual circuit, each of the pairs of successive endpoints defining a particular provider subnetwork operable by a particular independent provider.

16. The data communications device of claim 15 wherein the at least one counter further comprises a plurality of counters at pseudowire termination points, the pseudowire defined by a set of labeled paths between provider edge routers and operable as a virtual circuit through the core network.

17. The data communications device of claim 16 wherein the data communication device is further operable to:
   initiate counts at a termination point of the pseudowire;
   transmit the counts in a control message to the opposed termination point of the pseudowire; and
   commence, responsive to the received control message, the counts at the opposed termination point.

18. The data communications device of claim 17 wherein the data communication device is operable to maintain counts for a plurality of pseudowires, maintaining further comprising:
   at the termination point of the pseudowire, for each pseudowire termination, inspecting the packet to determine if the packet is in order, preceding a previously receive packet, or advanced from a next expected packet;
   if the packet is advanced, computing the difference of the received and expected packet numbers, and incrementing the lost packets by the computed difference; and
   if the packet is preceding, incrementing the out of order packets.

19. A computer readable medium encoded with a computer program for tracking packet loss, the computer program product comprising:
   computer program code for selectively identifying a router interconnection from a plurality of router interconnections for packet anomaly count detection;
   computer program code for tracking packet anomalies at at least one termination point of the router interconnection, tracking packet anomalies further comprising:
   at a particular termination point of a pseudowire, for each pseudowire termination, inspecting the packet to determine if the packet is in order, preceding a previously receive packet, or advanced from a next expected packet;
   if the packet is advanced, computing the difference of the received and expected packet numbers, and incrementing the lost packets by the computed difference; and
   if the packet is preceding, incrementing the out of order packets; and
   computer program code for periodically exchanging statistics of packet anomaly count detection to synchronize packet anomaly counts between the termination points of the router interconnection, the statistics of packet anomaly count detection corresponding to the termination point and a particular opposed termination point, wherein the router interconnection is defined by two termination points of the pseudowire.

20. A data communications device for tracking packet loss comprising:
   means for selectively identifying a router interconnection from a plurality of router interconnections for packet anomaly count detection;
   means for tracking packet anomalies at at least one termination point of the router interconnection; and
   means for periodically exchanging statistics of packet anomaly count detection to synchronize packet anomaly counts between the termination points of the router interconnection, the statistics of packet anomaly count detection corresponding to the termination point and a particular opposed termination point;
   means for writing a sequence number in a packet, the sequence number corresponding to a set of packets sent on a particular pseudowire;
   means for receiving the sequence number in the packet at the termination end of the pseudowire, wherein the router interconnection is defined by two termination points of the pseudowire;
   means for compare the sequence number to previous sequence numbers to identify order and omission of packets; and
   means for posting statistics to a remote PE router by at least one of a VCCV status, L2TP WAN error notification, BFD keep alive, and an LSP status message.

* * * * *

UNITED STATES PATENT AND TRADEMARK OFFICE
CERTIFICATE OF CORRECTION

PATENT NO. : 7,773,611 B2 Page 1 of 1
APPLICATION NO. : 11/153649
DATED : August 10, 2010
INVENTOR(S) : Earl Hardin Booth, III et al.

It is certified that error appears in the above-identified patent and that said Letters Patent is hereby corrected as shown below:

In column 11, claim 1, line 16, after "points of" delete "the pseudowire includes".

In column 12, claim 11, line 35, after "points of" delete "the pseudowire includes".

In column 13, claim 19, line 21, before "computer readable medium" insert --non-transitory--.

Signed and Sealed this

Seventh Day of December, 2010

David J. Kappos
*Director of the United States Patent and Trademark Office*